(12) United States Patent
Adcock

(10) Patent No.: US 6,427,311 B1
(45) Date of Patent: Aug. 6, 2002

(54) METHOD OF MANUFACTURING SPINDLE COMPONENTS

(75) Inventor: Neil Adcock, Osgathorpe (GB)

(73) Assignee: Adcock Technology Limited, Leicestershire (GB)

( * ) Notice: Subject to any disclaimer, the term of this patent is extended or adjusted under 35 U.S.C. 154(b) by 0 days.

(21) Appl. No.: 09/375,885

(22) Filed: Aug. 17, 1999

(30) Foreign Application Priority Data

Oct. 20, 1998 (GB) .............................................. 9822935

(51) Int. Cl.⁷ .............................................. B21D 39/00
(52) U.S. Cl. ........................................ 29/509; 29/522.1
(58) Field of Search ...................... 29/898, 724, 898.07, 29/505, 509, 507, 508, 512, 513, 432, 283.5, 516, 522.1; 72/124, 399, 402; 285/334.5, 332, 328, 382

(56) References Cited

U.S. PATENT DOCUMENTS

| 2,928,170 A | | 3/1960 | McLaughlin ................. 29/444 |
| 3,069,490 A | * | 12/1962 | Polizzano |
| 4,574,448 A | | 3/1986 | Brandenstein et al. ..... 29/283.5 |
| 5,375,323 A | | 12/1994 | Sata ........................... 29/888.1 |
| 5,729,951 A | | 3/1998 | Frohlich ...................... 52/698 |
| 6,131,743 A | * | 10/2000 | Czerwoniak et al. |

FOREIGN PATENT DOCUMENTS

| DE | 195 35 519 A 1 | 3/1997 |
| GB | 2 034 439 A | 6/1980 |
| GB | 2 324 490 A | 10/1998 |

* cited by examiner

Primary Examiner—David P. Bryant
(74) Attorney, Agent, or Firm—Westman, Champlin & Kelly, P.A.

(57) ABSTRACT

With reference to FIG. 3 the present invention relates to a method of manufacture of a product from a first component (4) of deformable material and a second component (5), the method comprising the steps of:

inserting a portion of the first component (4) through an aperture predefined in the second component (5); and subsequently deforming the material of the first component (4) to form a pair of spaced apart shoulders (50) integral with the first component (4), the spaced apart shoulders (50) holding therebetween the second component (5) and thereby preventing the second component (5) sliding along the first component (4); wherein:

each shoulder (50) is formed by applying tool means (20, 21) to a surface of the first component (4) to create a recess in the surface and to form the shoulder (50) adjacent to the recess with the shoulder (50) being formed by displacement of the deformable material of the first component (4) during the creation of the recess.

The present invention also relates to apparatus for performing the method.

11 Claims, 5 Drawing Sheets

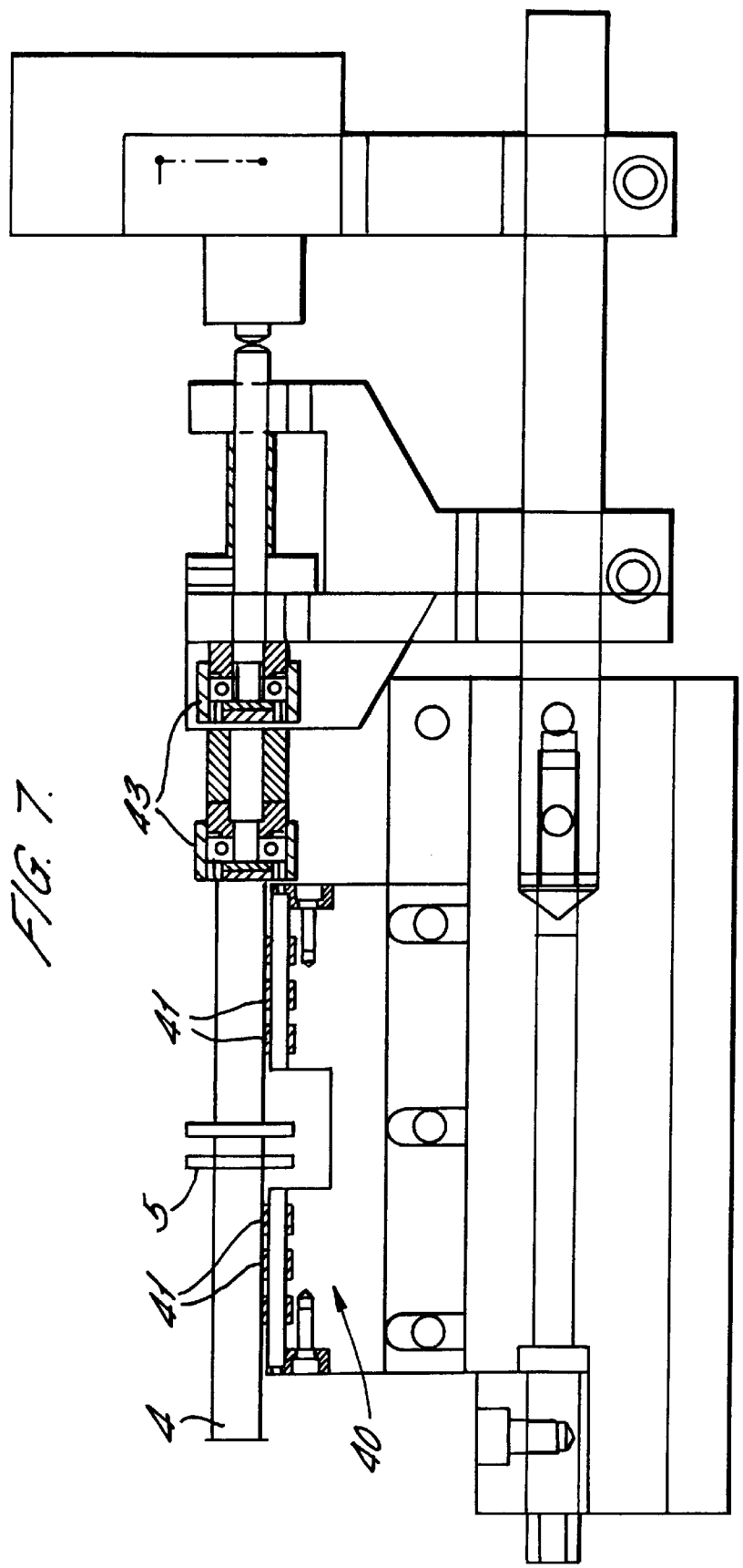

METHOD OF MANUFACTURING SPINDLE COMPONENTS

The present invention relates to apparatus for and a method of manufacturing spindles and in particular to a method of rigidly fixing secondary components such as flanges to a spindle.

Spindles in the form of cylindrical elongated rods are widely used in mechanical devices. Spindles may be used to transmit both axial and rotational forces between components of a machine and it is known to provide secondary components such as keys, keyways, splines and flanges on the spindle to facilitate such force transmission. Spindles may also comprise threaded portions and/or undercuts to facilitate attachment of the spindle to other components and reaction points such as the chassis in a vehicle. An example of the use of a spindle is as a mounting for a spring means in a vehicle seat adjuster. The spindle is provided with a flange at a point along its longitudinal axis against which one end of the spring means abuts. Axial force is transmitted from the spring means to the spindle (and then onto either a further component or a reaction point) through the flange. As can be readily appreciated the joint between the flange and the spindle undergoes shear stresses commensurate with the axial force imparted to the spring means.

It is known to attach secondary components such as keys and flanges to the central spindle by means of welding or soldering. However, soldering can result in a joint between the secondary component and the spindle which is too weak to transmit the required forces. Welding, whilst providing a strong joint requires aggressive heating of the components which can be deleterious to the strength and hardness properties of the spindle and/or flange. Soldering and welding can also result in an unacceptably uneven surface to the secondary component and spindle in the vicinity of the joint and are processes which are labour intensive, slow and expensive to carry out.

The present invention provides in a first aspect a method of manufacture of a product from a first component of deformable material and a second component, the method comprising the steps of:

inserting a portion of the first component through an aperture predefined in the second component; and subsequently deforming the material of the first component to form a pair of spaced apart shoulders integral with the first component, the spaced apart shoulders holding therebetween the second component and thereby preventing the second component sliding along the first component; wherein:

each shoulder is formed by applying tool means to a surface of the first component to create a recess in the surface and to form the shoulder adjacent to the recess with the shoulder being formed by displacement of the deformable material of the first component during the creation of the recess.

The present invention provides in a second aspect apparatus for fixedly locating of a first component having a cylindrical portion a second component having an aperture therein of a diameter chosen such that the second component is mountable on, and freely slidable along the cylindrical portion of the first component, the apparatus comprising:

freely rotating means for supporting the first component;

first and second shafts disposed parallel to one another, at least one of the first and second shafts being movable in a plane perpendicular to its axis in a direction towards the other shaft;

means for rotating the first and second shafts;

first and second roller means axially spaced apart positioned on each shaft, the first and second roller means each having first and second inclined surfaces of differing inclinations and the first and second inclined surfaces of the first roller means on one shaft having inclinations which match the inclinations of the first and second inclined surfaces of the first roller means on the other shaft and the first and second inclined surfaces of the second roller means on one shaft having inclinations which match the inclinations of the first and second inclined surfaces of the second roller means on the other shaft; wherein:

the first and second shafts are moved towards each other to engage the first and second roller means of each shaft with the first component, with the engagement of the roller means with the first component generating forces which act to force the first and second roller means towards each other, such force arising due to the differing inclinations between the first and second inclined surfaces of each roller means; and the engagement of the roller means with the first component can deform material of the first component on either side of the second component with the forces applied to the first component forming thereon raised shoulders, the raised shoulders being located on both sides of the second component and fixedly locating second component on the first component.

The present invention provides apparatus for use in an automatic method for fixing secondary components, such as flanges, to spindles without soldering or welding which results in a joint strong enough to transmit high axial and rotational forces between the spindle and secondary component and yet does not require external or aggressive heating of the spindle and/or secondary component.

The present invention provides a quicker, safer, stronger and more precise method of jointing secondary components to spindles than is known in the state of the art.

Preferred embodiments of the present invention will now be described by way of example only with reference to and as shown in the accompanying drawings, in which:

FIG. 1 a front elevation of an apparatus according to a first embodiment of the present invention;

FIG. 7 is cross-sectional side elevation of a further part of the apparatus of FIGS. 1 and 5.

Figure 1:
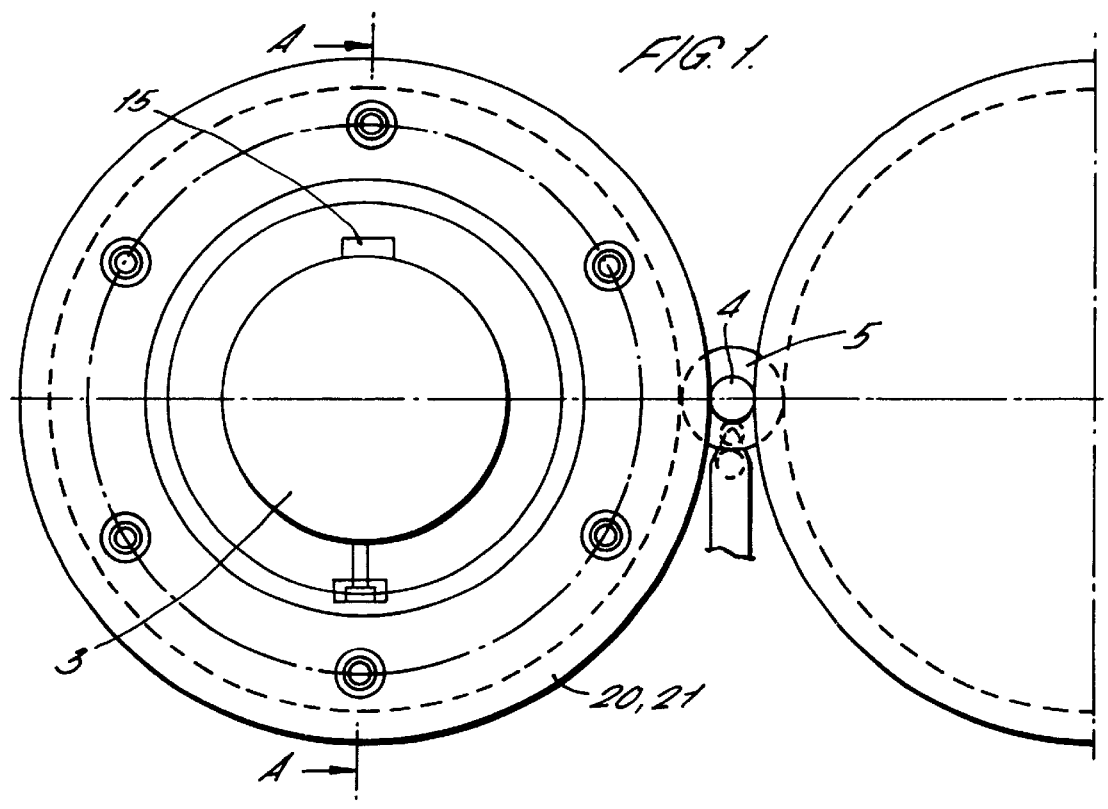
Figure 2:
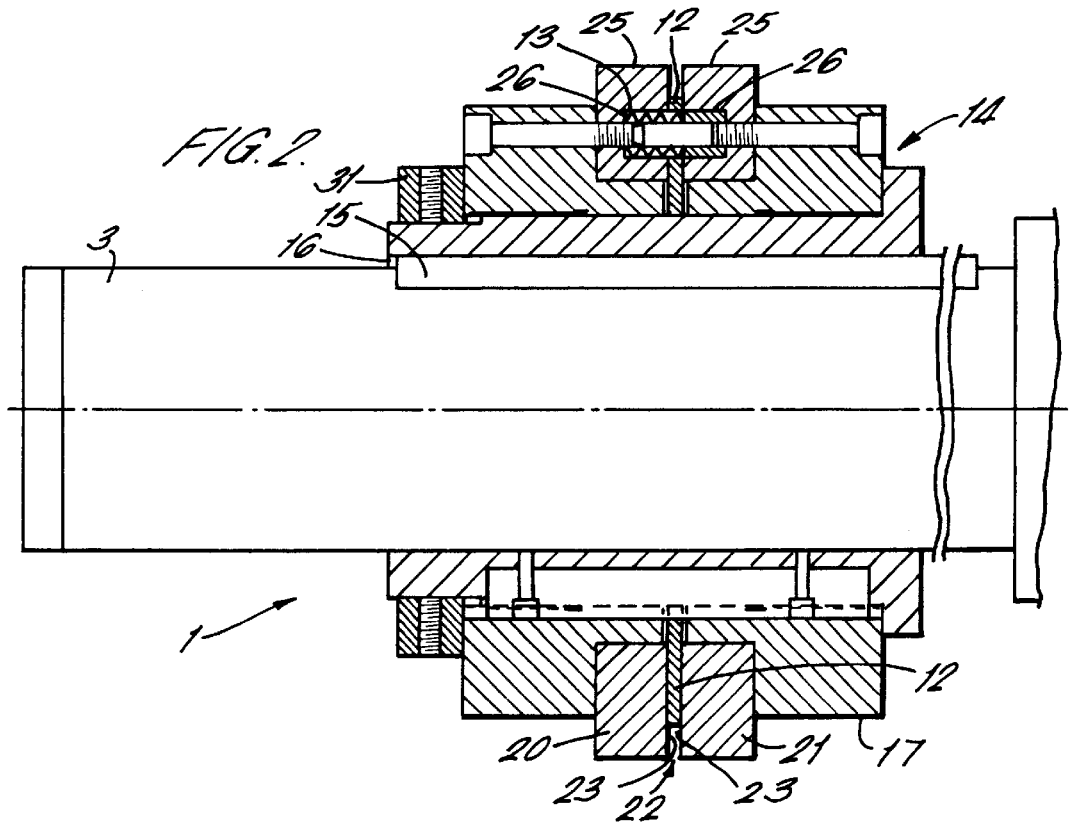
FIG. 2 is a cross-sectional elevation taken on line A—A of FIG. 1.

FIGS. 1 and 2 show a first embodiment of an apparatus according to the present invention. The apparatus 1 comprises two rotating shafts 3 disposed parallel to one another. One of the shafts 3 is on fixed centres whilst the other shaft is positioned within a hydraulically operated slide (not shown) which allows the shaft 3 to undergo controlled movement in a direction perpendicular to the axis of the shaft 3 towards the fixed shaft, whilst remaining disposed parallel thereto.

Each shaft 3 comprises an annular roller mount 14 disposed around the shaft 3. A key 15 formed on the shaft 3 and keyway 16 formed in the roller mount 14 transmit rotational forces between the shaft 3 and roller mount 14 and ensure that no relative movement occurs therebetween.

The roller mount 14 of each shaft 3 comprises on an outer face 17 two rollers 20, 21 of generally annular shape. The rollers 20, 21 are spaced apart in the axial direction to produce a gap 22 between inner side faces 23 of the rollers 20, 21. Positioned within the gap 22 is an annular inner plate 12 which is fixed radially relative to shaft 3. Each roller 20, 21 is mounted within the roller mount 14 such that it is slidable in the axial direction. The inner side face 23 of each roller 20, 21 includes a recess 26 in opposition to one another. Spring means 13 in form of Belleville washers or die type springs are anchored in each recess 26 and span between the two rollers 20, 21 to bias the rollers 20, 21 apart such that the gap 22 is maximised when the apparatus is in an inoperative condition. The maximum dimension of the gap 22 is adjustable using adjuster nut 31 and this enables the axial starting position of the rollers 20, 21 to be established. Different numbers and types of Belleville washers may be utilised to alter the effective spring force between the two rollers 20, 21. The annular inner plate 12 provides a limit stop to prevent the rollers 20, 21 from moving too close to one another axially to damage the biasing means 13.

An outer face of the annular rollers 20, 21 forms a rolling face 25. The configuration of the rolling face 25 is most clearly shown in FIGS. 3 and 4. Each roller 20, 21 has portions which gradually incline outwardly. The rollers 20, 21 also have annular projections 27A and 27B each of generally triangular shape when viewed in cross-section as shown in FIG. 4. The projections 27A and 27B have relatively steeply inclined face 28A and 28B (at an $\alpha$ angle to the radial direction) nearest the inner side face 23 of the roller and a shallower inclined face 29A and 29B (at an angle $\beta$ to the longitudinal axis) furthest from the inner side face 23 of the roller. In the preferred embodiment shown in FIG. 3 and 4 $\alpha$ is 45° and $\beta$ is 9°. In addition the faces 25 have portions 30 of minimal inclination (at an angle $\gamma$ to the longitudinal axis and in the preferred embodiment $\gamma$ is 1°). The remainder of the faces 25 are right cylindrical, having a substantially uniform outer diameter.

The component to be machined is a spindle 4 of elongated, generally cylindrical form. The spindle 4 may comprise recessed and/or raised portions. However the portion of the spindle 4 in the vicinity of the area to be machined is cylindrical, having an even outer diameter. Preferably the spindle 4 has an elongation of greater than or equal to 12 per cent.

In the preferred embodiment the component to be fixed to the spindle 4 is a washer 5 which has a central aperture of diameter marginally greater than the outer diameter of the cylindrical portion of the spindle 4 such that the washer 5 is free to slide along the axis of the spindle 4 before being fixed thereto. The outer diameter of the washer 5 is immaterial to the present invention.

In use the spindle 4 is positioned between the two shafts 3 such that the three longitudinal axes of the two shafts 3 and the spindle 4 are component linear.

The spindle 4 is supported on a freely rotating rest 40 as shown in FIG. 7. The freely rotating rest 40 comprises a series of rolling bearings 41 in a generally U-shaped trough in which the spindle 4 may be positioned such that the roller bearings bear at a number of points along the longitudinal length of the spindle 4. The roller bearings 41 help to prevent the axis of the spindle 4 being deformed out of true during the machining process. The freely rotating rest 40 also includes a freely rotating end stop 43 at one end against which one end of the spindle 4 abuts in use. The freely rotating rest 40 and end stop 43 both have the ability to rotate freely in order to accommodate the tangential forces set up by rolling friction and the combined Polar Moment of Inertia when the spindle 4 and washer 5 come into contact with the rollers 20, 21. The rotating end stop 43 is movable in the direction of the longitudinal axis of the spindle 4 form a rearwardly extended position (in which the spindle 4 may be introduced and removed from the apparatus) to a forwardly extended position.

The washer 5 to be fixed to the spindle 4 is introduced into the apparatus and positioned and held between the freely rotating rest 40 and the inner plates 12 of the roller mounts 14. The washer 5 is also positioned axially on the spindle 4 such that the washer is disposed between the inner side faces 23 of the rollers 20, 21.

The hydraulically operated slide on the movable shaft 3 is operated to bring the two shafts 3 and pairs of rollers 20, 21 towards one another causing the rolling faces 25 of each roller 20, 21 to contact the surface of the spindle 4. The movement of the movable shaft 3 on the hydraulic slide is preferably controlled by automated means such as computerised control system of known design.

The pair of rollers 20 contact the spindle 4 axially to one side of the washer 5 and the other pair of rollers 21 contact the spindle 4 axially on the other side. Due to the low frictional characteristics of the freely rotating roller rest 40 and rotating end stop 41, contact between the rollers 20, 21 and spindle 4 causes the spindle 4 to rotate such that there is no relative tangential movement between the rolling faces 25 and the spindle surface 4 at the junction. In other words the rollers 20, 21 positively rotate the spindle 4 without slippage between the spindle 4 and rolling faces 25.

Due to its enlarged diameter compared to the remainder of the roller, the extremity of the projection 27 is the first portion of the rolling faces 25 of the rollers 20, 21 to contact the spindle surface. Contact of the projection 27 with the spindle 4 results in a force being applied to the spindle 4. Due to the steeply inclined 28 and shallowly inclined 29 faces of the projection 27, on initial penetration of the projection 27 into the spindle surface the radial force supplied by the hydraulic slide moving the movable shaft 3 creates a force between each inclined face 28, 29 and the spindle 4 with radial and longitudinal components. Due to difference in angles $\alpha$ and $\beta$ there is set up a differential force in the longitudinal direction from each projection 27 in the direction of the washer 5. This differential force causes the rollers 20, 21 to move towards each other and the washer 5 against the biasing force of the Belleville springs 13 as the shafts 3 are brought into closer proximity. Due,to the symmetry of the rollers 20, 21 about the plane of the washer 5 the locus of movement of each of the rollers 20, 21 mirror one another. Thus the action of the projection 27 of the rollers 20, 21 deforms the material of the spindle in the vicinity of the washer 5 both radially and longitudinally to form an identical raised shoulder 50 on either side of the washer 5. The raised shoulder 50 has a diameter greater than that of both the remainder of the cylindrical portion of the spindle and the diameter of the aperture of the washer 5. The longitudinal deformation of the material of the spindle is such that the raised shoulder 50 also abuts against the side faces of the washer 5. Thus the raised shoulder firmly fixes the longitudinal position of the washer 5 relative to the spindle 4. The deformation can also be great enough to rotationally fix the washer 5 relative to spindle 4. The integrity of the rotational fixation of the washer 5 may be improved by providing surface indentations or serrations in the side faces of the washer near the aperture edge into which deformed material may flow; the deformed material and indentations having a keying effect.

The size of the projection 27 is such that the total volume of material deformed is slightly greater than the volume of material raised above the initial diameter of the cylindrical portion of the spindle necessary to form the raised shoulder. The small excess of material deformed creates a cusp 51 of material adjacent to the side faces of the washer 5. The cusps so formed prevent the inside side faces 23 of the rollers 20, 21 contacting and damaging the side faces of the washer 5.

The angles $\alpha$ and $\beta$ may be altered in order to created different profiles of raised shoulder and also to alter the magnitude of the differential force. The greater the difference between angles $\alpha$ and $\beta$ the greater the differential force. It has been found that angle $\alpha$ is preferably at least four times the magnitude of the angle $\beta$ to create a sufficient differential force. In the embodiment described above angle $\alpha$ equals 45° and angle $\beta$ equals 9°.

The minimally inclined parts of surfaces 30 of the roller 20, 21 spaces the remainder of the rolling faces apart from the spindle surface. The remainder of the rolling faces advantageously "irons" out any deformities in the spindle surface remote from the raised shoulder caused by the forming process.

The presence of identical sets of rollers 20, 21 on both shafts 3 means that forces applied to the spindle in the forming process are symmetrical; no bending moments are imparted on the spindle 4 and no resultant axial forces are experienced by the shafts.

After formation of the raised shoulders 50 the movable shaft 3 is moved away from the fixed shaft causing the rollers 20, 20 to return to there inoperative, spaced apart position under the bias of the Belleville washers 13. The rotating end stop 51 is moved to its rearward most position and the finished spindle 4 is removed leaving the apparatus ready to receive the next spindle to be formed.

The present invention is suitable for precisely positioning the longitudinal placement of the washer 5 on the spindle 4 since the longitudinal position of the washer 5 is determined solely by the distance between the rotating end stop 43 against which one end of the spindle abuts and the centre of the gap 22 between the two rollers 20, 21. This distance is consistent and maybe easily calibrated.

Figure 5:
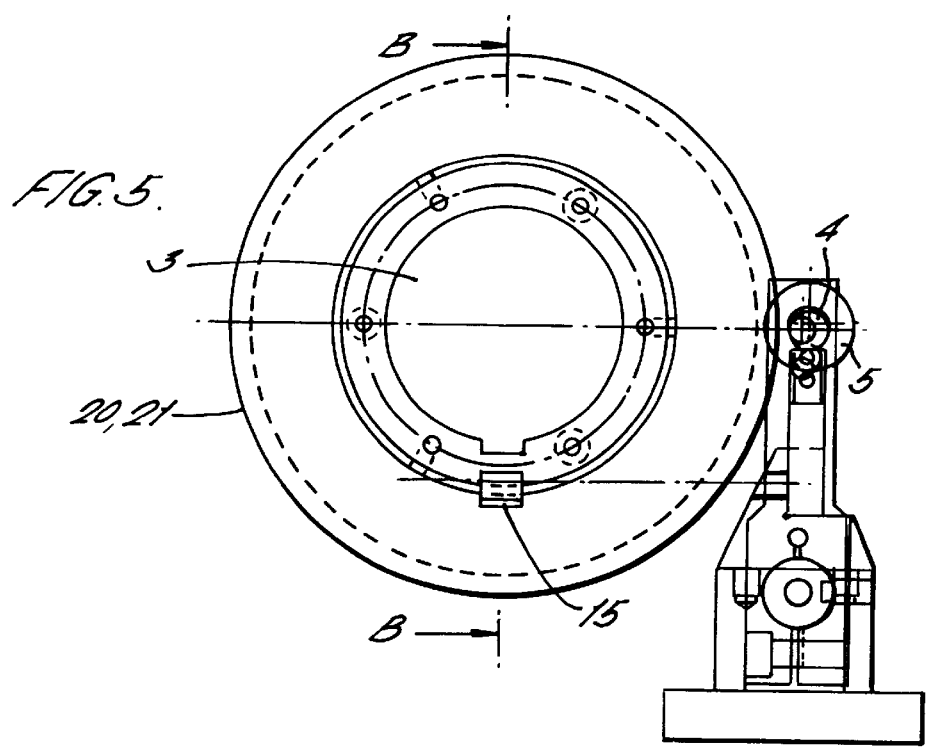
FIG. 5 is front elevation of an apparatus according to a second embodiment of the present invention.
Figure 6:
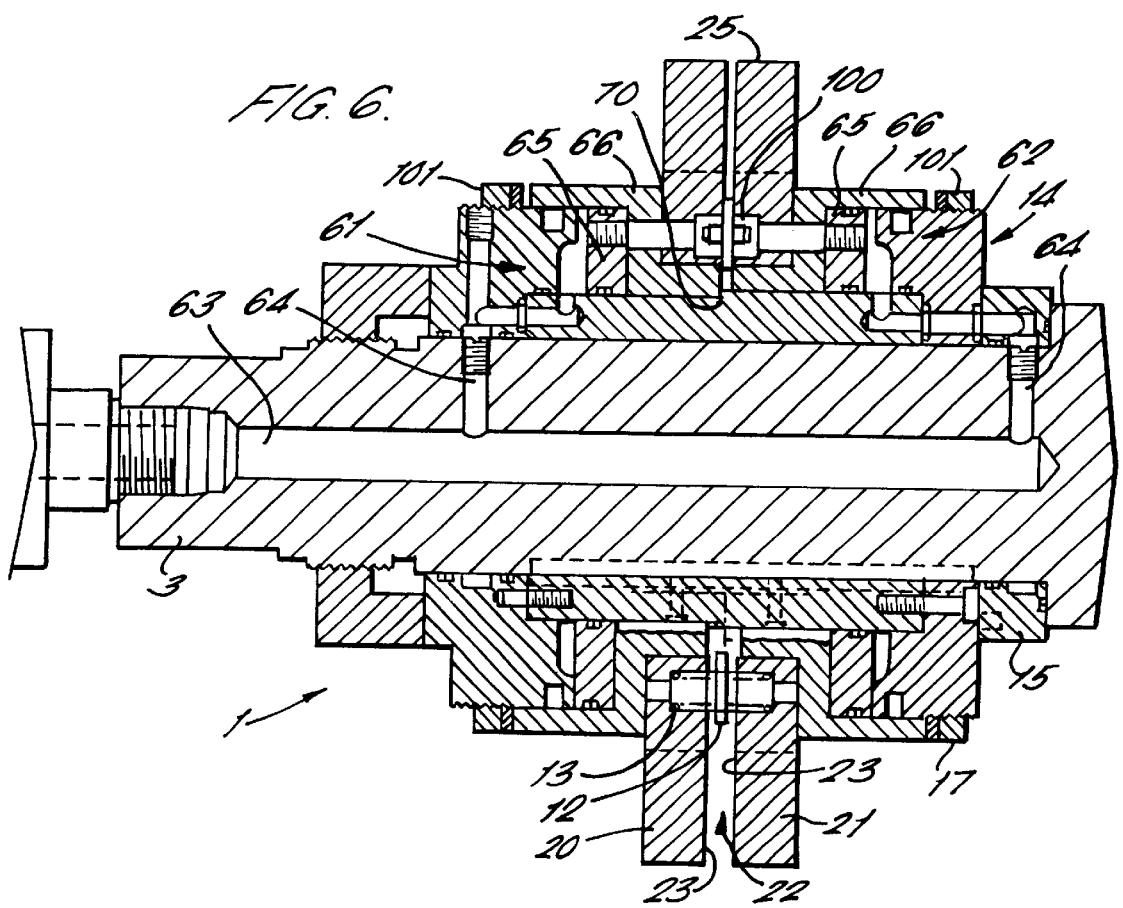
FIG. 6 is a cross-sectional elevation taken on line B—B of FIG. 5.

A second embodiment of the present invention is shown in FIGS. 5 and 6. The rolling faces 25 of the rollers 20, 21 in the second embodiment are as described in the first embodiment. In the embodiment however, the movement of each roller 20, 21 is positively and separately controlled by hydraulic means. Hydraulic pressure and flow is provided to each shaft 3 through a suitable known connection means such as Deublin rotating distributors. Hydraulic flow is fed to first and second piston means 61, 62 through internal conduits 63, 64. Each piston means 61, 62 comprises a piston 65 fixedly attached to a roller carrier 66. Each roller carrier 66 is attached to, and moves with one of the rollers 20, 21. Thus the piston means 61, 62 is utilised to move the roller 20, 21 inwardly towards each other and are biased outwardly by springs such as spring 100 or such as the Belleville Springs 13 of the first embodiment. Adjuster nuts 101 establish the axial starting position of the rollers 20, 21 which has to be precise relative to the geometry of the components and the volume of the shoulders 50 to be rolled. As a consequence of the use of the piston means 61, 62 each roller 20, 21 may be moved independently of the other.

Each roller 20, 21 is of the same general external configuration as in the first embodiment and an annular inner plate 12 is again provided in the gap 22 between the rollers 20, 21 as a compression limit stop. During the forming process the washer 5 rests against the rollers 20, 21 and must not contact the inner plate 12.

A digital control system of known type controls movement of each piston 65 and the hydraulic slide of the moveable shaft 3.

The piston 65 of the first piston means 61 has a slightly greater piston area than the piston 65 of the second piston means 62. In one aspect of the present invention the first piston means 61 has a piston area 2% greater than that of the second piston means 62. Due to identical hydraulic pressure being fed to each piston means, the increased area of the first piston means that a marginally greater force is applied to the spindle 4 by the first piston means 61 than by the second piston means 62. This has the effect of ensuring that the spindle is at all times abutted firmly against the rotating end stop 43 since the first piston means acts towards the rotating end stop 43.

Figure 3:
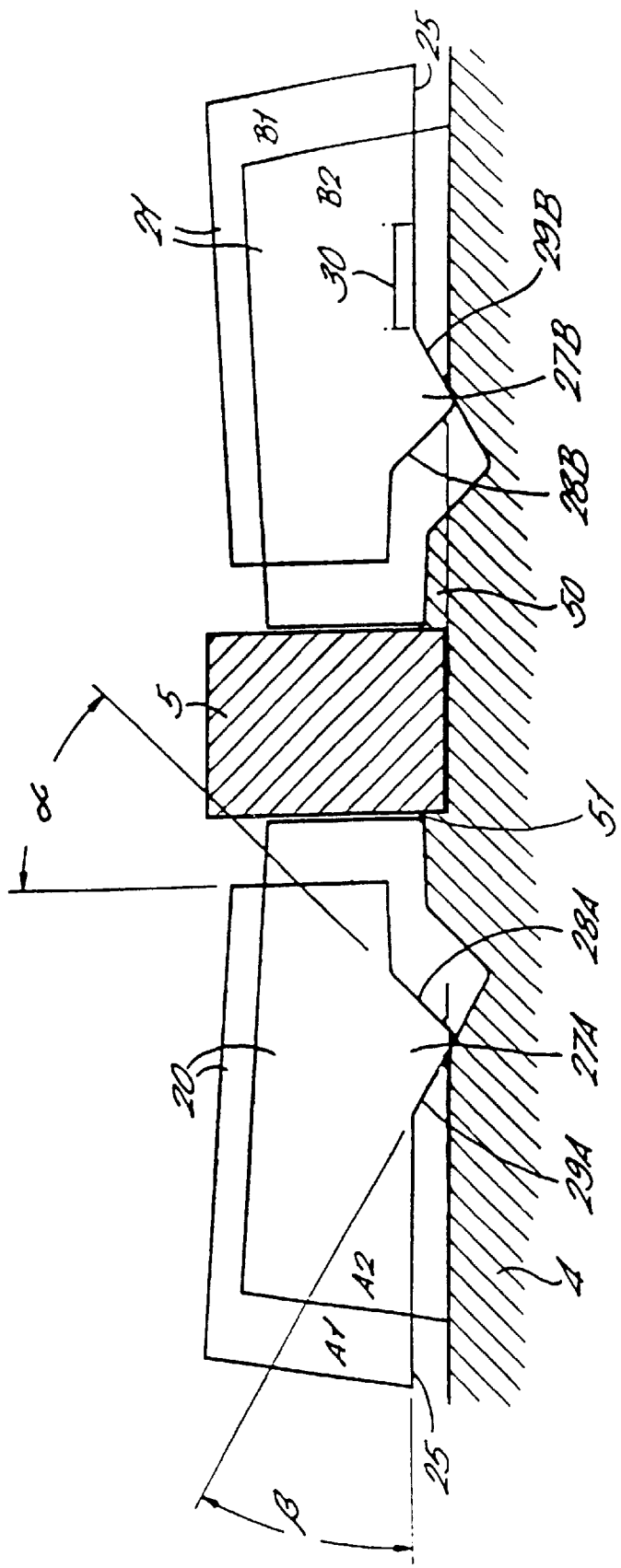
FIG. 3 is a schematic cross-section of a part of the apparatus of FIG. 1 in use.
Figure 4:
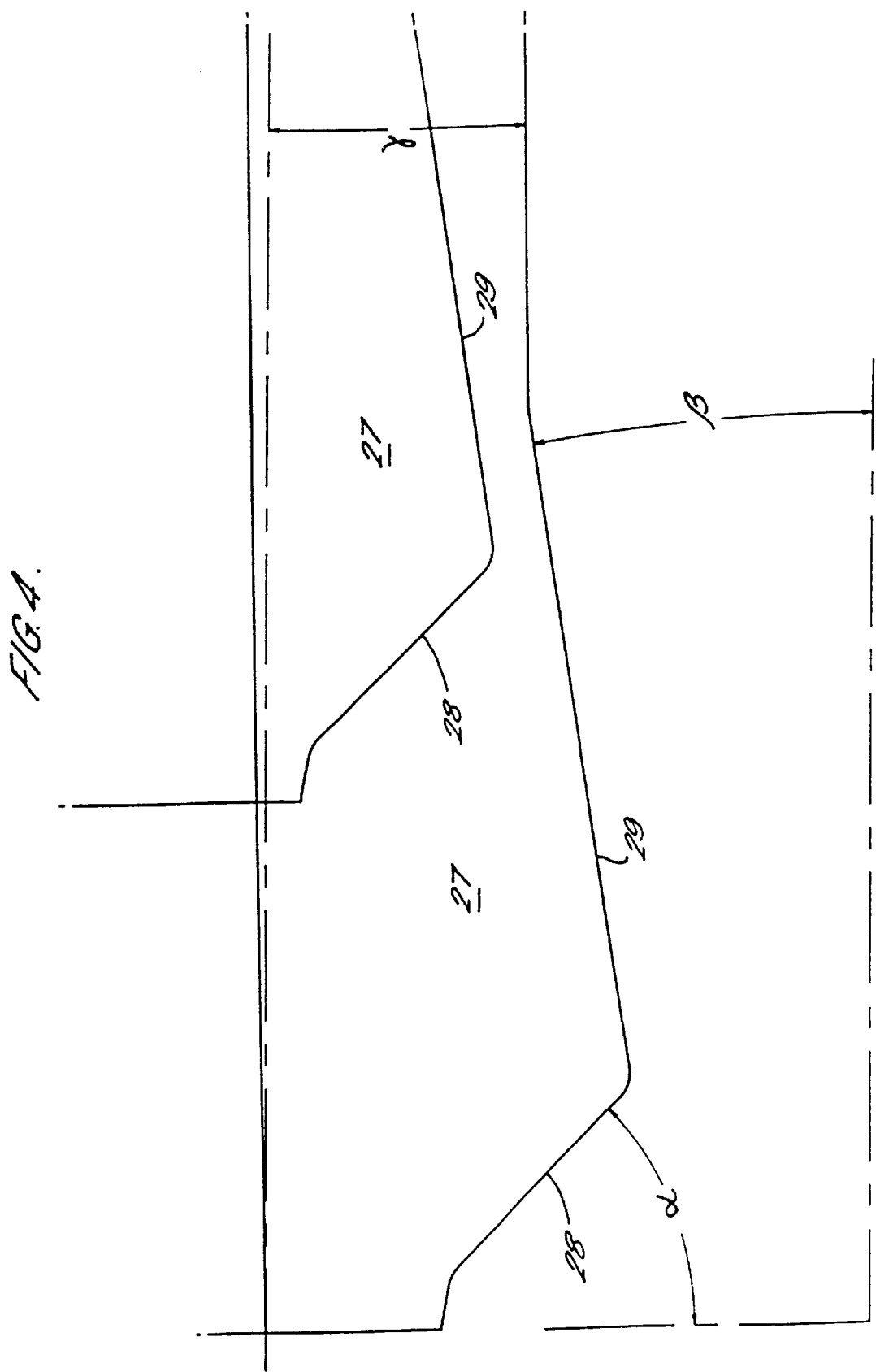
FIG. 4 is schematic diagram of a part of the apparatus of FIG. 1.

The first piston means 61 and corresponding roller 20 are moved longitudinally under control of the control system such that the projection 27A moves from position A1 in FIG. 3 to position A2. Movement of the first piston means 61 is limited by shoulder 70 against which the roller carrier abuts. Precise longitudinal positioning of the washer 5 on the spindle 4 may thus be ensured by calibrating the distance between the freely rotating end stop 43 and the shoulder 70. The second piston means 62 and roller 21 are operated to move the corresponding projection 27B from position B1 to position B2 as shown in FIG. 3. Different forces arise because of the different piston areas and therefore the second piston means 62 reaches its limit of motion after the first piston means 61. Advantageously the hydraulic system is used to supplement the differential forces set up by the geometry of the projection 27 to provide an improved forming process.

The hydraulic system used with the second embodiment comprises two independent power sources, controlled by electrically operated servo valves for each shaft 3. The servo valves are controlled by a closed loop electronic amplifier and digital position system. The piston means are provided with a feedback system working off a volumetric analyser giving square wave output signals which correspond to the hydraulic flow rate to each shaft. In this way the control system can ensure that the corresponding rollers 20, 21 on each shaft 3 move in precise alignment so as to avoid imparting any twisting forces on the spindle and/or vibrations to the apparatus. A feedback system on the main hydraulic slide, having a digital encoder with a reference pulse, is used to component-ordinate the timing of the piston means with the movable shaft 3. The two independent axis controls are linked for relative timing by the reference pulse. The velocity and stroke imparted to the forming rollers 20, 21 ensures a locus of travel along angle $\beta$ for each of the rollers 20, 21 until the final form position A2, B2 is reached.

The present invention according to the second embodiment has the advantage of the application of controllable forces, timing and geometry to enable the rollers 20, 21 to be designed to create a raised shoulder 50 of any required shear section and diameter. For example, the applicants have produced a spindle 4 having a thrust washer 5 with a shear section of $\leq 1.80$ mm per side which gives $\leq 20$ Kn of shear strength. The performance of the two pairs of rollers 20, 21 where construction and operation accuracy ensure close control of concentricity and axial accuracy of the rollers 20, 21 ($\leq 0.03$ per roller at 170 Dia) builds inherent accuracy into the rolling process. Ongoing SPC data shows capability at $\leq 0.02$ axial runout at 18 Dia on the washer 5 relative to the diameter of the spindle 4 adjacent to the washer 5.

Whilst the present invention has been described with reference to joining an annular washer to a spindle the invention is not limited to such. For example the apparatus and method described above may also be adapted for joining non-circular symmetric components to spindles having at least a cylindrical portion.

What is claimed is:

1. A method of manufacture of a product from a first component of deformable material and a second component, the method comprising steps of:

inserting a portion of the first component through an aperture predefined in the second component; and subsequently deforming the material of the first component to form a pair of spaced apart shoulders integral with the first component, the spaced apart shoulders holding therebetween the second component and thereby preventing the second component sliding along the first component; wherein:

each of the spaced apart shoulders being formed by applying roller means to a surface of the first component to create a recess in the surface, each shoulder being formed adjacent to a recess respectively by displacement of the deformable material of the first component during the creation of the recess; and in the method the first component rotates during the formation of the shoulders; and in the method the roller means moves along the surface of the first component in a direction towards the second component during formation of the shoulders.

2. A method of manufacture as claimed in claim 1 further comprising a step of sliding the second component along the first component by engagement of the second component with at least one of the spaced apart shoulders during their formation, each of the spaced apart shoulders being formed in such a way that the second component is pushed towards an other shoulder of the pair of shoulders, with the second component being eventually secured in place on the first component by the simultaneous engagement of both of the spaced apart shoulders.

3. A method as claimed in claim 1 wherein the first component is a metal component and the roller means used is a metal working roller means.

4. A method as claimed in claim 1 wherein the portion of the first component inserted through the aperture in the second component is cylindrical, the aperture in the second component is circular and matches in diameter the cylindrical portion of the first component, and the method further includes a step of forming each of the shoulders on the cylindrical portion of the first component, each of the spaced apart shoulders comprising an annular ridge of a diameter greater than a diameter of a remainder of the cylindrical portion and each recess comprising an annular recess extending around a circumference of the cylindrical portion.

5. A method as claimed in claim 4 wherein the first component is a generally cylindrical spindle and the second component is a washer.

6. A method as claimed in claim 1 wherein the roller means applied comprises a rolling face which has a triangular portion with an apex which is a first point of the tool engaged with the first component, the triangular portion having first and second inclined surfaces extending away from the apex at different inclinations, the method further including steps of applying a force on the tool perpendicular to the surface of the first component while allowing the roller means to move along the surface of the first component under the influence of a resultant force generated by interaction of the two differently inclined surfaces of the rolling face with the surface of the first component.

7. A method as claimed in claim 6 comprising additionally a step of applying a force on the roller means which acts tangentially to the surface of the first component and which assists in displacement of material to form both a recess and a shoulder.

8. A method as claimed in claim 1 wherein the roller means comprises a pair of rollers and the method additionally comprises steps of:

engaging the pair of rollers with the first component, one on either side of a mounted second component, with each roller forming one shoulder;

generating forces on the pair of rollers which act both to force the rollers perpendicularly into the surface of the first component and also tangentially along the surface of the first component towards each other; and using tangential forces generated during the formation of the shoulders to slide the second component along the first component to a desired location relative to the first component in which the second component is engaged by both shoulders of the pair of shoulders.

9. A method as claimed in claim 1 wherein a volume of deformable material displaced to form each recess is greater than the volume of the deformable material forming each shoulder of the pair of shoulders and the method comprises a step of forming from excess material displaced to form each recess a cusp adjacent to the second component.

10. A method as claimed in claim 1 including forming one or more recesses in a surface of the second component surrounding the aperture in the second component and the method includes a step of forcing material of the first component displaced when forming the recesses in the first component into the one or more recesses in the surface of the second component during formation of the pair of shoulders so that in a manufactured product the pair of shoulders prevent translation of the second component and engagement of material of the first component in the one or more recesses of the second component prevents relative rotation between the first and second components.

11. A method as claimed in claim 1, in which:

the roller means used comprises first and second rollers positioned on a first shaft and first and second rollers positioned on a second shaft;

to start formation of the shoulders the first and second shafts are moved towards each other to engage the rollers on each shaft with the first component; and the first and second rollers on each shaft move in unison on engagement with the first component so that no bending moments are imposed on the first component.

* * * * *